US012681450B2

(12) United States Patent
Joseph et al.

(10) Patent No.: US 12,681,450 B2
(45) Date of Patent: Jul. 14, 2026

(54) BUILDING CONTROL DEVICE WITH PEER-TO-PEER COMMUNICATION FOR ENHANCED FUNCTIONALITY

(71) Applicant: Honeywell International Inc., Charlotte, NC (US)

(72) Inventors: Jeslin Paul Joseph, Bengaluru (IN); Sivasanthanam Dhayalan, Bangalore (IN); Karthikeyan Kannaiyan, Tamil Nadu (IN); Abhisekh Jain, Madurai (IN); Kingslin Joseph, Karnataka (IN); Sunil Madhusuthanan, Nagercoil (IN); Dinesh Babu Rajamanickam, Thanjavur (IN); Benitta Hubert, Tamil Nadu (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 351 days.

(21) Appl. No.: 18/357,868

(22) Filed: Jul. 24, 2023

(65) Prior Publication Data

US 2025/0036093 A1     Jan. 30, 2025

(51) Int. Cl.
*G05B 19/042*          (2006.01)

(52) U.S. Cl.
CPC .. *G05B 19/042* (2013.01); *G05B 2219/25011* (2013.01)

(58) Field of Classification Search
CPC ...................................................... G05B 19/042

(Continued)

(56) References Cited

U.S. PATENT DOCUMENTS

| | | | |
|---|---|---|---|
| 6,880,100 | B2 | 4/2005 | Mora et al. |
| 7,075,567 | B2 | 7/2006 | Hunter et al. |

(Continued)

FOREIGN PATENT DOCUMENTS

| | | |
|---|---|---|
| CN | 101986367 A | 3/2011 |
| CN | 105516658 B | 10/2019 |

(Continued)

OTHER PUBLICATIONS

Kučera, Adam, Petr Glos, and Tomáš Pitner. "Fault detection in building management system networks." IFAC Proceedings vols. 46.28 (2013): 416-421. (Year: 2013).*

(Continued)

*Primary Examiner* — Mohammad Ali
*Assistant Examiner* — Joshua T Sanders
(74) *Attorney, Agent, or Firm* — Seager, Tufte & Wickhem, LLP

(57)          ABSTRACT

The health status of each of a plurality of services running on a building control device of a building control system may be monitored. The health status of each of the plurality of services may be selected from two or more predetermined health status conditions including a normal health status and a hung health status, wherein the hung health status indicates that the corresponding service is currently down and/or otherwise non-responsive. The building control device determines the health status of each of the plurality of services running on the building control device. The building control device wirelessly transmits the health status of at least those services running on the building control device that are determined to have the hung health status, if any.

15 Claims, 12 Drawing Sheets

(58) Field of Classification Search
USPC ........................................................ 700/28
See application file for complete search history.

(56) References Cited

U.S. PATENT DOCUMENTS

| | | | |
|---|---|---|---|
| 7,194,395 B2 | 3/2007 | Genovese | |
| 7,646,725 B1 | 1/2010 | Soukup et al. | |
| 7,683,934 B2 | 3/2010 | Montminy et al. | |
| 8,131,838 B2 * | 3/2012 | Bornhoevd | G06F 8/60 |
| | | | 709/224 |
| 8,959,395 B2 | 2/2015 | Havemose | |
| 9,230,250 B1 | 1/2016 | Parker et al. | |
| 9,384,656 B2 | 7/2016 | Patterson et al. | |
| 9,402,266 B2 | 7/2016 | Choi et al. | |
| 9,591,508 B2 | 3/2017 | Halasz et al. | |
| 10,102,738 B2 | 10/2018 | Tung et al. | |
| 10,147,307 B2 | 12/2018 | Patterson et al. | |
| 10,460,581 B1 * | 10/2019 | Devison | G08B 13/19 |
| 10,573,165 B2 | 2/2020 | Schwarzkopf et al. | |
| 10,810,061 B2 | 10/2020 | Srinivasalureddy et al. | |
| 10,832,563 B2 | 11/2020 | Subramanian et al. | |
| 10,931,692 B1 | 2/2021 | Mota et al. | |
| 11,042,145 B2 | 6/2021 | Zhang et al. | |
| 11,055,652 B1 | 7/2021 | Kannan et al. | |
| 11,369,321 B2 | 6/2022 | Kwan | |
| 11,410,539 B2 | 8/2022 | Kasiviswanathan | |
| 11,508,234 B1 | 11/2022 | Balamurugan et al. | |
| 2004/0155757 A1 | 8/2004 | Litwin, Jr. et al. | |
| 2006/0242453 A1 | 10/2006 | Kumar et al. | |
| 2007/0126869 A1 | 6/2007 | Montminy et al. | |
| 2007/0290842 A1 * | 12/2007 | Barone | G08B 13/1654 |
| | | | 340/539.22 |
| 2009/0174544 A1 | 7/2009 | Allen et al. | |
| 2010/0128691 A1 * | 5/2010 | McFarland | H04L 12/2827 |
| | | | 700/277 |
| 2011/0013018 A1 * | 1/2011 | Leblond | G08B 13/19695 |
| | | | 348/143 |
| 2014/0266678 A1 | 9/2014 | Shapiro et al. | |
| 2014/0336791 A1 | 11/2014 | Conti et al. | |
| 2016/0360555 A1 * | 12/2016 | Berezowski | H04L 45/243 |
| 2017/0171873 A1 * | 6/2017 | Shaw | H04W 4/14 |
| 2017/0193395 A1 | 7/2017 | Limonad et al. | |
| 2017/0351787 A1 | 12/2017 | Kapuschat et al. | |
| 2018/0333083 A1 | 11/2018 | Orellano | |
| 2018/0356809 A1 | 12/2018 | Trainor et al. | |
| 2019/0068627 A1 | 2/2019 | Thampy | |
| 2019/0196424 A1 | 6/2019 | Meganathan et al. | |
| 2019/0260786 A1 | 8/2019 | Dunn | |
| 2020/0218801 A1 | 7/2020 | Gross et al. | |
| 2020/0285737 A1 | 9/2020 | Kraus et al. | |
| 2020/0358908 A1 * | 11/2020 | Scalisi | G08B 13/19667 |
| 2020/0388135 A1 | 12/2020 | Vaknin et al. | |
| 2021/0295668 A1 | 9/2021 | Blanchard et al. | |
| 2021/0314298 A1 | 10/2021 | Chen et al. | |
| 2021/0377278 A1 | 12/2021 | Yin et al. | |
| 2022/0005332 A1 | 1/2022 | Metzler et al. | |
| 2022/0014425 A1 | 1/2022 | Mandliwala et al. | |
| 2022/0058497 A1 * | 2/2022 | Vazquez-Canteli | G05B 15/02 |
| 2022/0058941 A1 | 2/2022 | Lamb | |
| 2022/0197235 A1 * | 6/2022 | Warake | G05B 19/042 |
| 2024/0028105 A1 * | 1/2024 | Morales | G06F 1/324 |

FOREIGN PATENT DOCUMENTS

| | | |
|---|---|---|
| JP | 2020005078 A | 1/2020 |
| JP | 7195781 B2 | 12/2022 |
| WO | 2019099111 A1 | 5/2019 |

OTHER PUBLICATIONS

Extended European Search Report, EP Application No. 24186638.3, European Patent Office, Dec. 20, 2024 (9 pages).
EP192116340 Extended European Search Report, 8 pages, May 25, 2020.

* cited by examiner

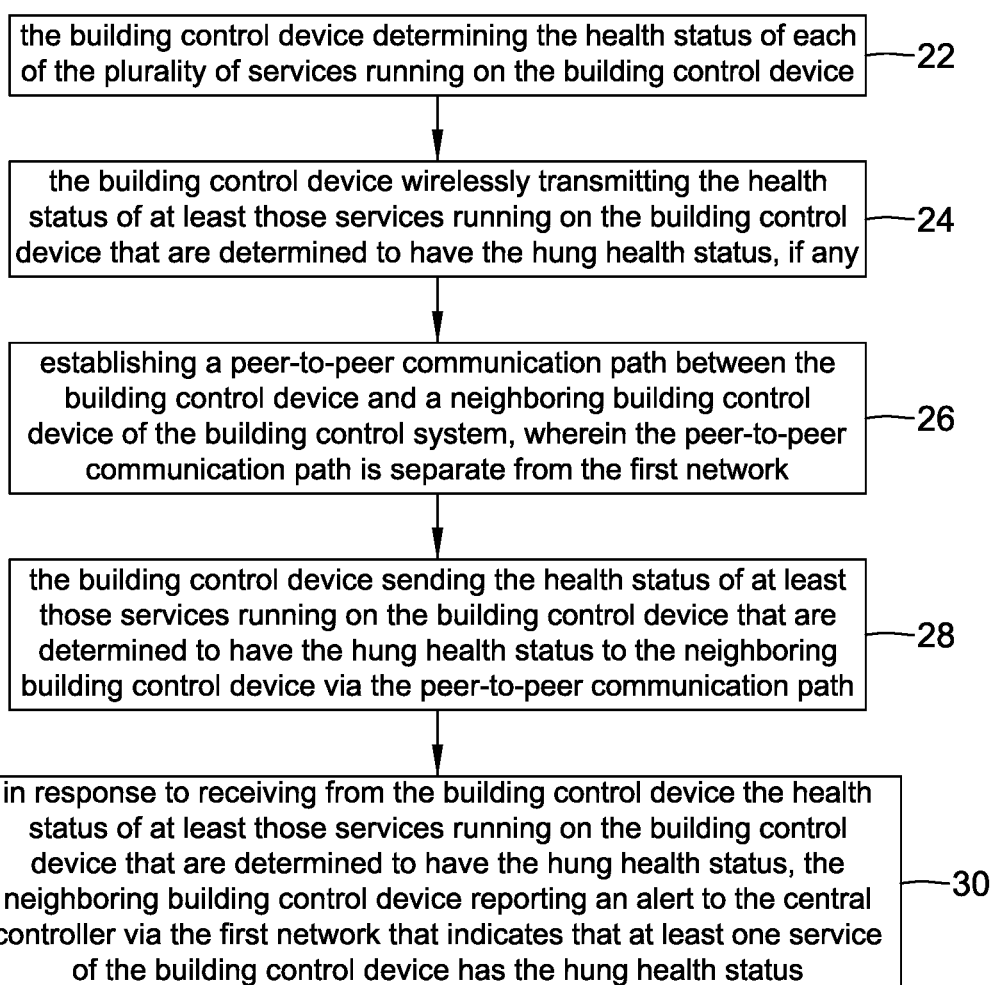

the building control device determining the health status of each of the plurality of services running on the building control device —22 the building control device wirelessly transmitting the health status of at least those services running on the building control device that are determined to have the hung health status, if any —24 establishing a peer-to-peer communication path between the building control device and a neighboring building control device of the building control system, wherein the peer-to-peer communication path is separate from the first network —26 the building control device sending the health status of at least those services running on the building control device that are determined to have the hung health status to the neighboring building control device via the peer-to-peer communication path —28 in response to receiving from the building control device the health status of at least those services running on the building control device that are determined to have the hung health status, the neighboring building control device reporting an alert to the central controller via the first network that indicates that at least one service of the building control device has the hung health status —30

FIG. 2

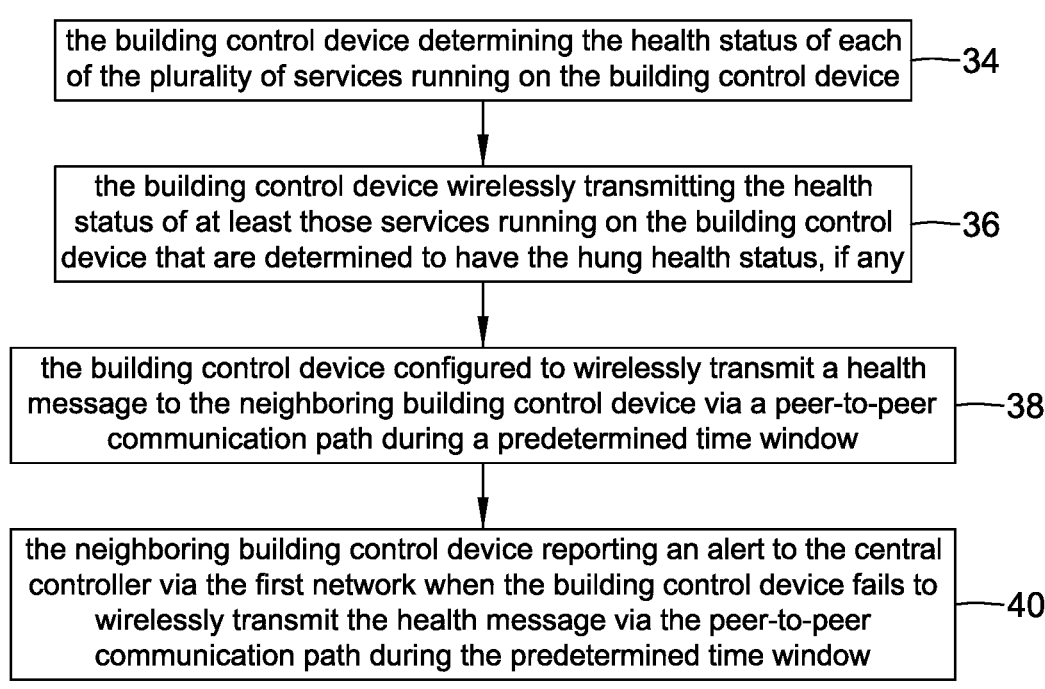

the building control device determining the health status of each of the plurality of services running on the building control device —34 the building control device wirelessly transmitting the health status of at least those services running on the building control device that are determined to have the hung health status, if any —36 the building control device configured to wirelessly transmit a health message to the neighboring building control device via a peer-to-peer communication path during a predetermined time window —38 the neighboring building control device reporting an alert to the central controller via the first network when the building control device fails to wirelessly transmit the health message via the peer-to-peer communication path during the predetermined time window —40

FIG. 3

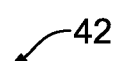

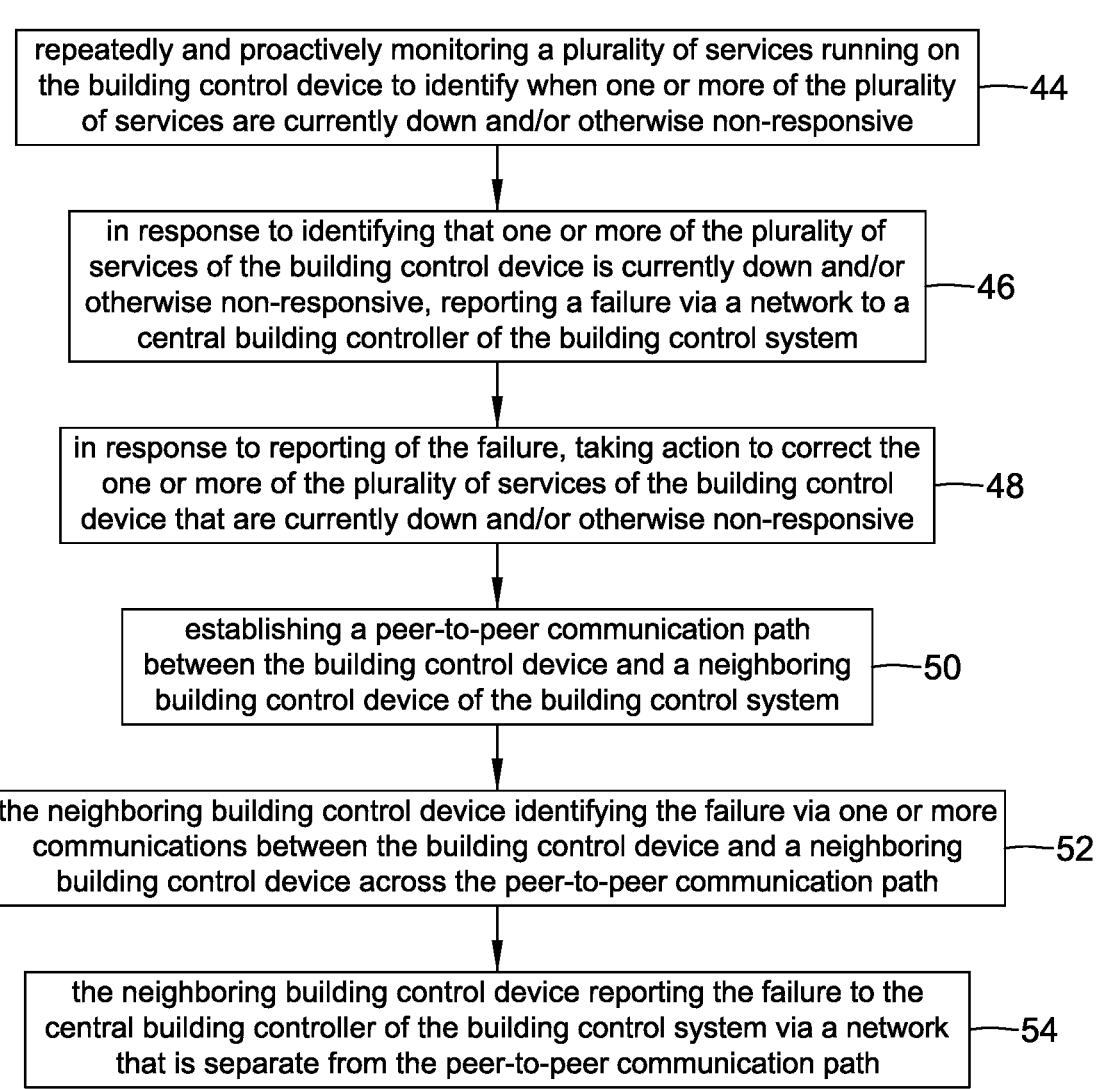

42 repeatedly and proactively monitoring a plurality of services running on the building control device to identify when one or more of the plurality of services are currently down and/or otherwise non-responsive — 44 in response to identifying that one or more of the plurality of services of the building control device is currently down and/or otherwise non-responsive, reporting a failure via a network to a central building controller of the building control system — 46 in response to reporting of the failure, taking action to correct the one or more of the plurality of services of the building control device that are currently down and/or otherwise non-responsive — 48 establishing a peer-to-peer communication path between the building control device and a neighboring building control device of the building control system — 50 the neighboring building control device identifying the failure via one or more communications between the building control device and a neighboring building control device across the peer-to-peer communication path — 52 the neighboring building control device reporting the failure to the central building controller of the building control system via a network that is separate from the peer-to-peer communication path — 54

FIG. 4

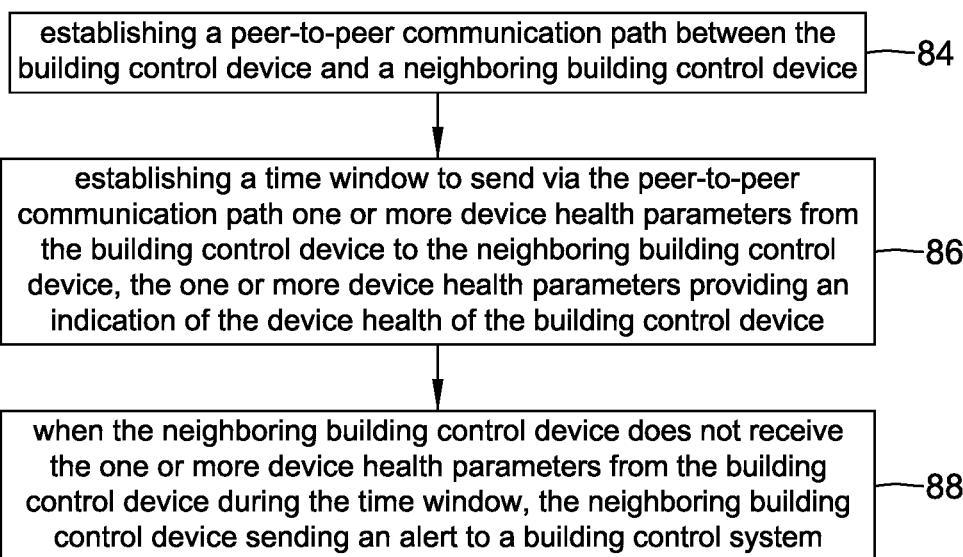

82 establishing a peer-to-peer communication path between the
building control device and a neighboring building control device ⎯84 establishing a time window to send via the peer-to-peer
communication path one or more device health parameters from
the building control device to the neighboring building control
device, the one or more device health parameters providing an
indication of the device health of the building control device ⎯86 when the neighboring building control device does not receive
the one or more device health parameters from the building
control device during the time window, the neighboring building
control device sending an alert to a building control system ⎯88

FIG. 8

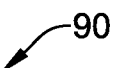
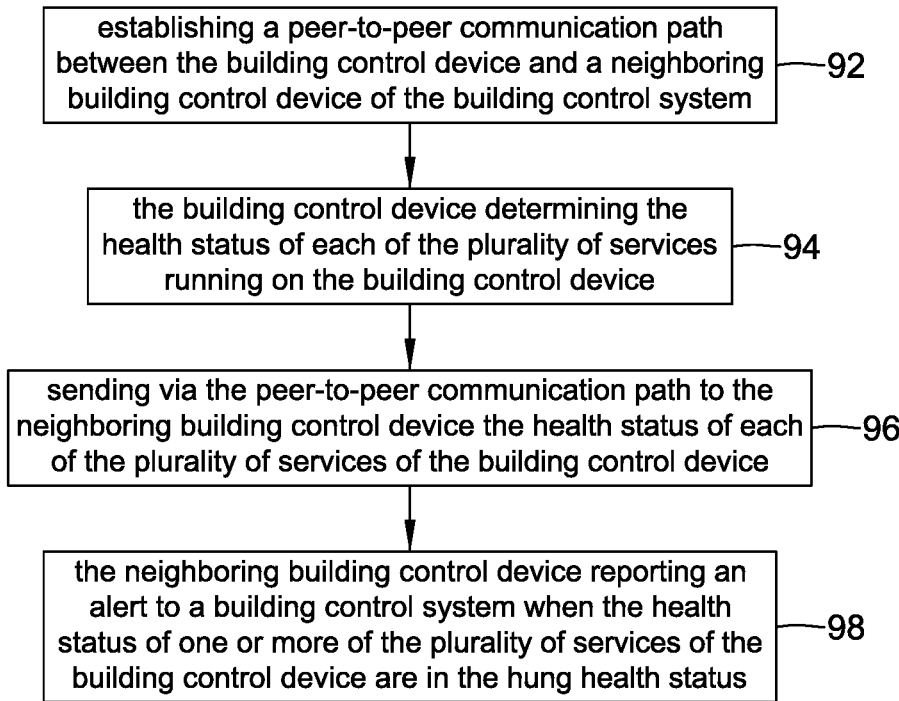
FIG. 9

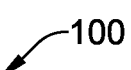

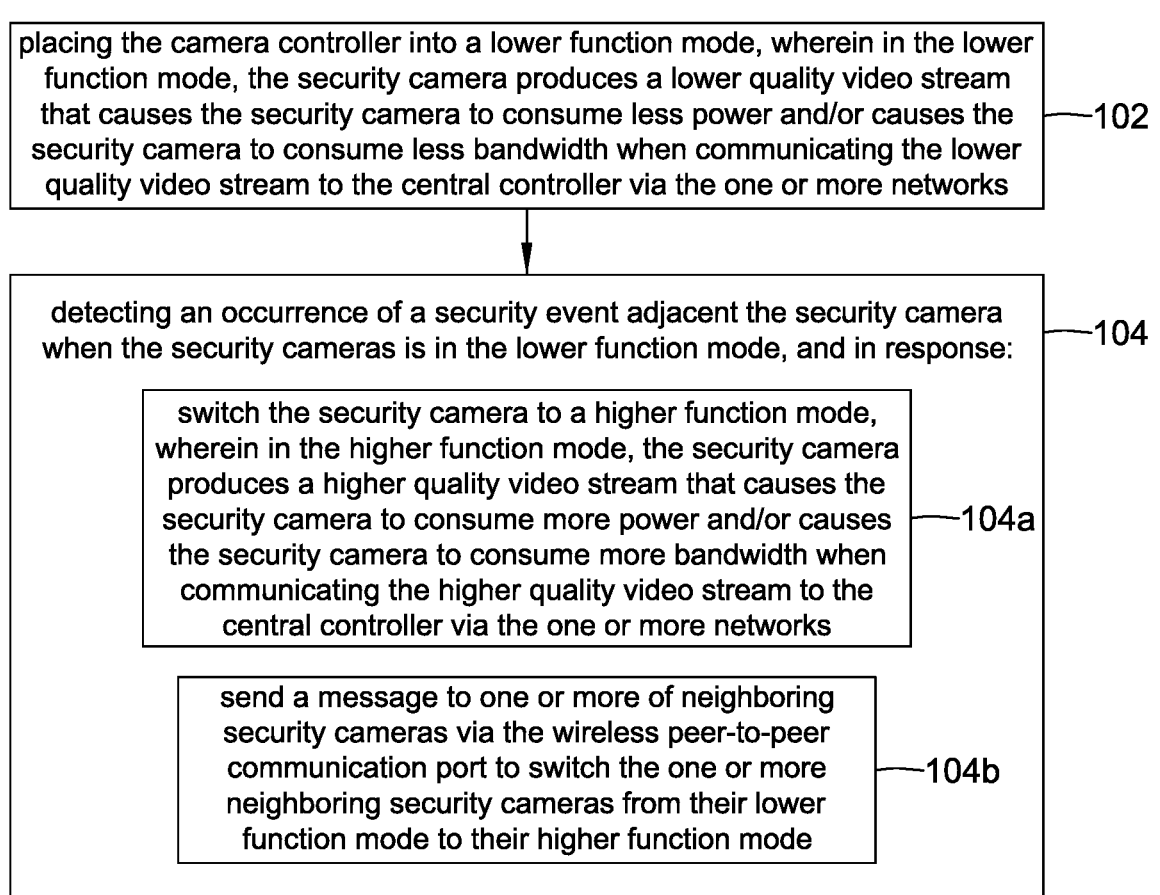

—100 placing the camera controller into a lower function mode, wherein in the lower function mode, the security camera produces a lower quality video stream that causes the security camera to consume less power and/or causes the security camera to consume less bandwidth when communicating the lower quality video stream to the central controller via the one or more networks    —102 detecting an occurrence of a security event adjacent the security camera when the security cameras is in the lower function mode, and in response:    —104 switch the security camera to a higher function mode, wherein in the higher function mode, the security camera produces a higher quality video stream that causes the security camera to consume more power and/or causes the security camera to consume more bandwidth when communicating the higher quality video stream to the central controller via the one or more networks    —104a send a message to one or more of neighboring security cameras via the wireless peer-to-peer communication port to switch the one or more neighboring security cameras from their lower function mode to their higher function mode    —104b

FIG. 10

detecting a security event via a first one of the plurality of sensors —108 sending the message from the first one of the plurality of sensors to a first neighboring one of the plurality of sensors via a wireless peer-to-peer communication path indicating the detection of the security event by the first one of the plurality of sensors —110 the first neighboring one of the plurality of sensors: —112 receiving the message —112a determining whether the first neighboring one of the plurality of sensors also detected the security event —112b reporting the security event to a central security controller with a lower confidence score when the first neighboring one of the plurality of sensors did not detected the security event —112c reporting the security event to the central security controller with a higher confidence score than the lower confidence score when the first neighboring one of the plurality of sensors also detected the security event —112d automatically pairing the first one of the plurality of sensors and the first neighboring one of the plurality of sensors —114

BUILDING CONTROL DEVICE WITH PEER-TO-PEER COMMUNICATION FOR ENHANCED FUNCTIONALITY

TECHNICAL FIELD

The present disclosure relates generally to building control devices such as security devices, lighting devices, Heating, Ventilation and/or Air Condition (HVAC) device, and more particular building control devices with peer-to-peer communication for enhanced functionality.

BACKGROUND

Building control systems include a number of building control devices. A building control device may include a number of different services running on the building control device. Some of the services may be running properly while other services may not be. For example, some of the services may become hung, meaning that the service is currently down and/or otherwise non-responsive. When one or more services on a building control device become hung, the performance of the building control device, and hence the performance of the building control system, may suffer. What would be desirable are improved methods for monitoring the health of each of the services running on a building control device.

SUMMARY

The present disclosure relates generally to building control devices such as security devices, lighting devices, Heating, Ventilation and/or Air Condition (HVAC) device, and more particular building control devices with peer-to-peer communication for enhanced functionality. For example, building control devices may include peer-to-peer communication for enhanced health monitoring of the building control devices by monitoring a health status of services running on a building control device. In another example, building control devices may use peer-to-peer communication to reduce power consumption of certain building control devices by maintaining some building control devices in a reduced power state and when a particular building control device detects an alarm and/or event, one or more of the neighboring building control devices may be woken up to help validate the detected alarm and/or event. In yet another example, building control devices may use peer-to-peer communication to improve a confidence score of an alarm and/or event detected by a building control device by having neighboring building control devices confirm the alarm and/or event (or not).

An example may be found in a method for monitoring a health status of each of a plurality of services running on a building control device of a building control system, wherein the health status of each of the plurality of services is selected from two or more predetermined health status conditions including a normal health status and a hung health status, wherein the hung health status indicates that the corresponding service is currently down and/or otherwise non-responsive. The example method includes the building control device determining the health status of each of the plurality of services running on the building control device. The building control device wirelessly transmits the health status of at least those services running on the building control device that are determined to have the hung health status, if any. In some cases, the health status may be wirelessly transmitted via a peer-to-peer communication path to one or more neighboring building control device, which can help determine whether one or more of the services running on the building control device are in fact in the hung state.

Another example may be found in a method for monitoring services running on a building control device of a building control system. The method includes repeatedly and proactively monitoring a plurality of services running on the building control device to identify when one or more of the plurality of services are currently down and/or otherwise non-responsive. In response to identifying that one or more of the plurality of services of the building control device is currently down and/or otherwise non-responsive, a failure is reported via a network to a central building controller of the building control system.

Another example may be found in a building control system that includes a plurality of building control devices and a central building controller, wherein the plurality of building control devices are operatively coupled to the central building controller via one or more networks. A first one of the plurality of building control devices establishes a wireless peer-to-peer communication path with a second neighboring one of the plurality of building control devices, wherein the wireless peer-to-peer communication path is separate from the one or more networks. The first one of the plurality of building control devices and/or the second one of the plurality of building control devices repeatedly and proactively monitor a plurality of services running on the first building control device to identify when one or more of the plurality of services running on the first building control device are currently down and/or otherwise non-responsive. In response to identifying that one or more of the plurality of services of the first one of the plurality of building control devices is are currently down and/or otherwise non-responsive, the second one of the plurality of building control devices report a failure via the one or more networks to the central building controller.

Another example may be found in a method for monitoring device health of a building control device. The method includes establishing a peer-to-peer communication path between the building control device and a neighboring building control device and establishing a time window to send via the peer-to-peer communication path one or more device health parameters from the building control device to the neighboring building control device, the one or more device health parameters providing an indication of the device health of the building control device. When the neighboring building control device does not receive the one or more device health parameters from the building control device during the time window, the neighboring building control device sends an alert to a building control system.

Another example may be found in a method for monitoring a health status of each of a plurality of services running on a building control device of a building control system, wherein the health status of each of the plurality of services is selected from two or more predetermined health status conditions including a normal health status and a hung health status, wherein the hung health status indicates that the corresponding service is currently down and/or otherwise non-responsive. The method includes establishing a peer-to-peer communication path between the building control device and a neighboring building control device of the building control system. The building control device determines the health status of each of the plurality of services running on the building control device. The method includes sending via the peer-to-peer communication path to the neighboring building control device the health status of each of the plurality of services of the building control device. The neighboring building control device reports an alert to a building control system when the health status of one or more of the plurality of services of the building control device are in the hung health status.

Another example may be found in a security system that includes a plurality of video cameras each operatively coupled with a central controller via one or more networks. A first one of the plurality of video cameras include an I/O port for communicating a video stream captured by the corresponding video camera to the central controller via the one or more networks, a wireless peer-to-peer communication port for establishing a wireless peer-to-peer communication with one or more neighboring ones of the plurality of video cameras, and a camera controller operatively coupled to the I/O port and the wireless peer-to-peer communication port. The camera controller includes a lower function mode, wherein in the lower function mode, the corresponding video camera produces a lower quality video stream that causes the corresponding video camera to consume less power and/or causes the corresponding video camera to consume less bandwidth when communicating the lower quality video stream to the central controller via the one or more networks. The camera controller also includes a higher function mode, wherein in the higher function mode, the corresponding video camera produces a higher quality video stream that causes the corresponding video camera to consume more power and/or causes the corresponding video camera to consume more bandwidth when communicating the higher quality video stream to the central controller via the one or more networks. The camera controller is configured to detect an occurrence of a security event adjacent the first one of the plurality of video cameras when the first one of the plurality of video cameras is in the lower function mode, and in response, the controller is configured to switch to the higher function mode and to send a message to one or more neighboring ones of the plurality of video cameras via the wireless peer-to-peer communication port to switch the one or more neighboring ones of the plurality of video cameras from their lower function mode to their higher function mode.

Another example may be found in a method for operating a security camera that includes an I/O port for communicating a video stream captured by the corresponding video camera to a central controller via one or more networks, and a wireless peer-to-peer communication port for establishing a wireless peer-to-peer communication with one or more neighboring security cameras. The method includes placing the camera controller into a lower function mode, wherein in the lower function mode, the security camera produces a lower quality video stream that causes the security camera to consume less power and/or causes the security camera to consume less bandwidth when communicating the lower quality video stream to the central controller via the one or more networks. An occurrence of a security event is detected adjacent the security camera when the security cameras is in the lower function mode. In response, the security camera is switched to a higher function mode, wherein in the higher function mode, the security camera produces a higher quality video stream that causes the security camera to consume more power and/or causes the security camera to consume more bandwidth when communicating the higher quality video stream to the central controller via the one or more networks, and a message is sent to one or more of neighboring security cameras via the wireless peer-to-peer communication port to switch the one or more neighboring security cameras from their lower function mode to their higher function mode.

Another example may be found in a method for operating a security system that includes a plurality of sensors each for detecting a corresponding security event. The method includes detecting a security event via a first one of the plurality of sensors and sending a message from the first one of the plurality of sensors to a first neighboring one of the plurality of sensors via a wireless peer-to-peer communication path indicating the detection of the security event by the first one of the plurality of sensors. The first neighboring one of the plurality of sensors receives the message and determines whether the first neighboring one of the plurality of sensors also detected the security event. The first neighboring one of the plurality of sensors reports the security event to a central security controller with a lower confidence score when the first neighboring one of the plurality of sensors did not detected the security event and reports the security event to the central security controller with a higher confidence score than the lower confidence score when the first neighboring one of the plurality of sensors also detected the security event.

Another example may be found in a security system. The security system includes a first security sensor for detecting a security event. In response to the first security sensor detecting the security event, the first security sensor sends a message to a first neighboring security sensor via a wireless peer-to-peer communication path, the message indicating the detection of the security event by the first security sensor. The first neighboring security sensor either validates the security event by detecting the security event or does not validate the security event by not detecting the security event. The first security sensor and/or the first neighboring security sensor report the security event to a central security controller of the security system via a network that is separate from the wireless peer-to-peer communication path, the reported security event is assigned a confidence score that is dependent on whether the first neighboring security sensor was able to validate the security event or not.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which:

FIG. 2 is a flow diagram showing an illustrative method for monitoring a health status of each of a plurality of services running on a building control device of a building control system;

FIG. 3 is a flow diagram showing an illustrative method for monitoring a health status of each of a plurality of services running on a building control device of a building control system;

FIG. 4 is a flow diagram showing an illustrative method for monitoring services running on a building control device of a building control system;

FIG. 8 is a flow diagram showing an illustrative method for monitoring device health of a building control device;

FIG. 9 is a flow diagram showing an illustrative method for monitoring a health status of each of a plurality of services running on a building control device of a building control system;

FIG. 10 is a flow diagram showing an illustrative method for operating a security camera; and FIGS. 11A and 11B are flow diagrams that together show an illustrative method for operating a security system.

Figure 1:
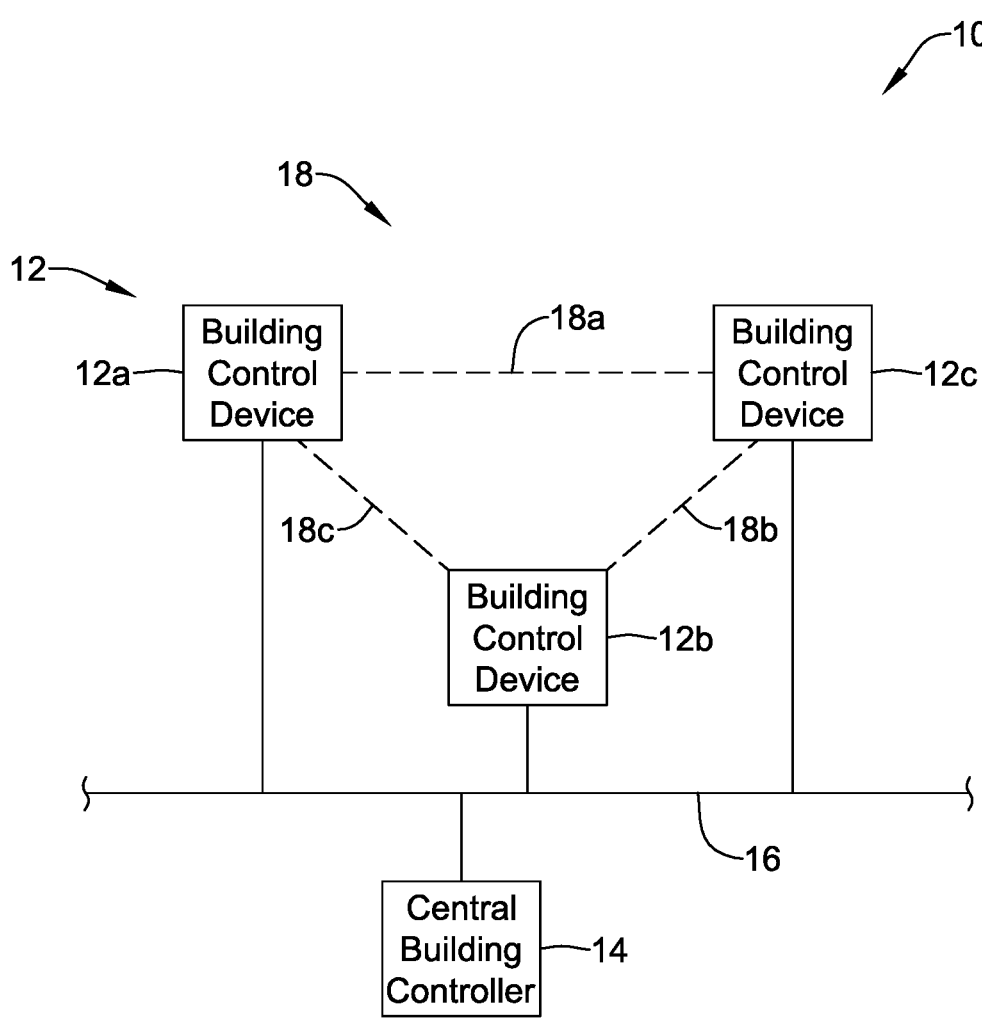
FIG. 1 is a schematic block diagram of an illustrative building control system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram showing an illustrative building control system 10. The illustrative building control system 10 includes a number of building control devices 12, individually labeled as 12a, 12b and 12c. While a total of three building control devices 12 are shown, it will be appreciated that this is merely illustrative, as the building control system 10 may include any number of building control devices 12, and in some instances may include considerably more than three building control devices 12. The building control devices 12 may each represent various security devices. In some instances, the building control devices 12 may each represent various video cameras. The building control system 10 includes a central building controller 14 that may be in communication with the building control devices 12 via a network 16. The network 16 may be a wired network. In some instances, the network 16 may be a wireless network. The network 16 may be a single network, or may represent two or more networks coupled together, for example.

In some instances, the building control system 10 may represent a video monitoring system. The building control devices 12 may each be a video camera, an intrusion sensor or an access control device. In some instances, the building control system 10 may represent a Heating, Ventilating and Air Conditioning (HVAC) system. The building control devices 12 may each be an HVAC device, for example.

In some instances, each of the building control devices 12 may include a wireless communication capability. In some instances, the building control devices 12 may establish a wireless peer-to-peer (P2P) communication path 18 between the individual building control devices 12. As an example, the P2P communication path 18 may include a leg 18a formed between the building control device 12a and the building control device 12c. The P2P communication path 18 may include a leg 18b formed between the building control device 12c and the building control device 12b. The P2P communication path 18 may include a leg 18c formed between the building control device 12b and the building control device 12a. In some instances, the P2P communication path 18 is established dynamically, as building control devices 12 find themselves in communication range with one or more other building control devices 12. Each of the building control devices 12 may dynamically form the P2P communication path 18 with one, two, three or more distinct building control devices 12, limited only by wireless communication ranges and signal strength.

In some instances, a first one of the number of building control devices 12, such as for example the building control device 12a, may establish establishing a wireless peer-to-peer communication path with a second neighboring one of the number of building control devices 12, such as the building control device 12b. The first one of the number of building control devices 12 (building control device 12a) and/or the second one of the number of building control devices 12 (building control device 12b) may repeatedly and proactively monitor a plurality of services running on the first building control device 12a to identify when one or more of the plurality of services running on the first building control device 12a are currently down and/or otherwise non-responsive. In response to identifying that one or more of the plurality of services of the first building control device 12a is are currently down and/or otherwise non-responsive, the second building control device 12b may report a failure via the network 16 to the central building controller 14.

Illustrative services running on a building control device such as a security camera may include, for example, one or more of:

TABLE 1

| Service Name | Purpose |
| --- | --- |
| Onvif server service | Responsible for Head end system integration like Central Monitoring Station (CMS)/ |

7

TABLE 1-continued

| Service Name | Purpose |
|---|---|
| | Network Video Recorder (NVR) |
| VA service | Responsible to Make sure Video Analytic (Motion, Face detection etc..) working as expected |
| PTZ server | Responsible to make sure - PAN, TILT, ZOOM, IRIS, FOCUS working as expected |
| Media Server | Responsible for streaming the video to requested client |
| RTSP server | Responsible to stream RTSP video to requested client |
| Network Manager | Responsible to make sure network related features are working as expected |
| User manager | Responsible to manage the user configuration/ Roles/permissions |
| Bonjour service | Responsible to make sure respond to auto discovery of cameras to the requested client |
| Firmware Upgrade server service | Responsible to give current Firmware version, check upgrade version compatibility and respond back once upgrade is complete with success/Failure message |
| Health Monitor service | Responsible to monitor camera resource usage like CPU usage increases, Memory Growth etc. |

The services shown in Table 1 are only illustrative, and it is contemplated that different and/or other services may be running on a security camera. Each of these services may be individually tracked and reported when determined to be down and/or otherwise non-responsive (e.g. hung state). It is contemplated that the services may be application initiated services and/or operating system initiated services.

In some instances, in response to the reported failure of a service, the central building controller 14 may take action to correct the one or more of the plurality of services of the first building control device 12a that are currently down and/or otherwise non-responsive. In some instances, the first building control device 12 may include a video camera. In some instances, and as shown in Table 1, the services running on the first building control device 12 may include a video analytics service that applies one or more video analytics to a video stream captured by the video camera. In some instances, the services running on the first building control device 12 may include a camera control service that controls a pan, a tilt, a zoom, a focus, and or an iris of the video camera. In some instances, the services running on the first building control device 12 may include a streaming service that controls streaming of a video stream captured by the video camera. These are just examples.

FIG. 2 is a flow diagram showing an illustrative method 20 for monitoring a health status of each of a plurality of services running on a building control device (such as the building control devices 12) of a building control system (such as the building control system 10), wherein the health status of each of the plurality of services is selected from two or more predetermined health status conditions including a normal health status and a hung health status, wherein the hung health status indicates that the corresponding service is currently down and/or otherwise non-responsive. The illustrative method 20 includes the building control device determining the health status of each of the plurality of services running on the building control device, as indicated at block 22. The building control device wirelessly transmits the health status of at least those services running on the building control device that are determined to have the hung health status, if any, as indicated at block 24. In some instances, the building control system includes a video monitoring system, and the building control device includes a video camera.

In some instances, the plurality of services may include a video analytics service that applies one or more video analytics to a video stream captured by the video camera. In some instances, the plurality of services may include a camera control service that controls a pan, a tilt, a zoom, a focus, and or an iris of the video camera. In some instances, the plurality of services may include a streaming service that controls streaming of a video stream captured by the video camera. In some instances, the plurality of services may include a network service that controls network communication between the building control device and one or more other devices of the building control system. In some instances, at least some of the plurality of services correspond to one or more application programs running on the building control device, wherein the one or more application programs are separate from and are supported by an operating system of the building control device. In some instances, the building control system may include a video monitoring system, and the building control device may include one of a video camera, an intrusion sensor, and an access control device. In some instances, the building control system may include a Heating, Ventilation and/or Air Conditioning (HVAC) system, and the building control device may include an HVAC device.

In some instances, the building control system includes a central controller, and the building control device is operatively coupled to the central controller via a first network. The method 20 may further include establishing a peer-to-peer communication path between the building control device and a neighboring building control device of the building control system, wherein the peer-to-peer communication path is separate from the first network, as indicated at block 26. In this example, the building control device sends the health status of at least those services running on the building control device that are determined to have the hung health status to the neighboring building control device via the peer-to-peer communication path, as indicated at block 28. In response to receiving from the building control device the health status of at least those services running on the building control device that are determined to have the hung health status, the neighboring building control device reports an alert to the central controller via the first network that indicates that at least one service of the building control device has the hung health status, as indicated at block 30. In some instances, the first network is a wired network. In some instances, the peer-to-peer communication path is a wireless communication path. In some cases, the building control device reports an alert to the central controller via the first network that indicates that at least one service of the building control device has the hung health status.

FIG. 3 is a flow diagram showing an illustrative method 32 for monitoring a health status of each of a plurality of services running on a building control device (such as the building control devices 12) of a building control system (such as the building control system 10), wherein the health status of each of the plurality of services is selected from two or more predetermined health status conditions including a normal health status and a hung health status, wherein the hung health status indicates that the corresponding service is currently down and/or otherwise non-responsive. The illustrative method 32 includes the building control device determining the health status of each of the plurality of services running on the building control device, as indicated at block 34. The building control device wirelessly transmits the health status of at least those services running on the building control device that are determined to have the hung health status, if any, as indicated at block 36.

In some instances, the building control system includes a central controller, and the building control device and a neighboring building control device of the building control system are operatively coupled to the central controller via a first network. The method 32 may further include the building control device is configured to wirelessly transmit a health message to the neighboring building control device via a peer-to-peer communication path during a predetermined time window, as indicated at block 38. The neighboring building control device reports an alert to the central controller via the first network when the building control device fails to wirelessly transmit the health message via the peer-to-peer communication path during the predetermined time window, as indicated at block 40. As an example, the health message may include the health status of at least those services running on the building control device that are determined to have the hung health status, if any.

FIG. 4 is a flow diagram showing an illustrative method 42 for monitoring services running on a building control device (such as the building control devices 12) of a building control system (such as the building control system 10). The illustrative method 42 includes repeatedly and proactively monitoring a plurality of services running on the building control device to identify when one or more of the plurality of services are currently down and/or otherwise non-responsive, as indicated at block 44. In response to identifying that one or more of the plurality of services of the building control device is currently down and/or otherwise non-responsive, a failure is reported via a network to a central building controller of the building control system, as indicated at block 46.

In some instances, the method 42 may include, in response to reporting of the failure, taking action to correct the one or more of the plurality of services of the building control device that are currently down and/or otherwise non-responsive, as indicated at block 48. As an example, taking action may include rebooting the building control device. As another example, taking action may include restarting the one or more of the plurality of services of the building control device that are currently down and/or otherwise non-responsive. These are just examples.

In some instances, the method 42 may include establishing a peer-to-peer communication path between the building control device and a neighboring building control device of the building control system, as indicated at block 50. The neighboring building control device may identify the failure via one or more communications between the building control device and the neighboring building control device across the peer-to-peer communication path, as indicated at block 52. The neighboring building control device may report the failure to the central building controller of the building control system via a network that is separate from the peer-to-peer communication path, as indicated at block 54.

Figure 5:
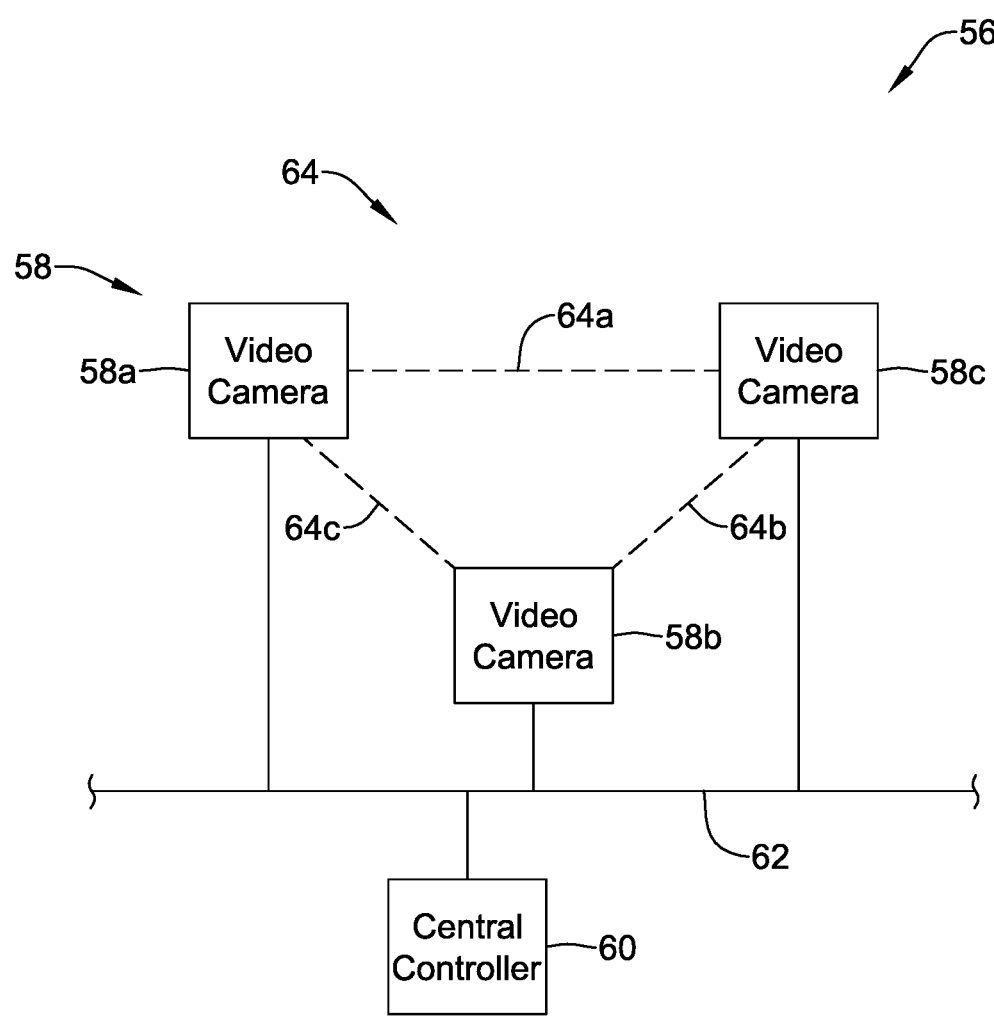
FIG. 5 is a schematic block diagram of an illustrative security system.

FIG. 5 is a schematic block diagram of an illustrative security system 56. The illustrative security system 56 may be considered as being an example of the building control system 10, for example. The security system 56 includes a number of video cameras 58, individually labeled as 58a, 58b and 58c. While a total of three video cameras 58 are shown, it will be appreciated that this is merely illustrative, as the security system 56 may include any number of video cameras 58, and in some instances may include considerably more than three video cameras 58. The security system 56 includers a central controller 60 that may be in communication with the video cameras via a network 62. The network 62 may be a wired network. In some instances, the network 62 may be a wireless network. The network 62 may be a single network, or may represent two or more networks coupled together, for example.

In some instances, each of the video cameras 58 may include a wireless communication capability. In some instances, the video cameras 58 may establish a wireless peer-to-peer (P2P) communication path 64 between the individual video cameras 58. As an example, the P2P communication path 64 may include a leg 64a formed between the video camera 58a and the video camera 58c. The P2P communication path 64 may include a leg 64b formed between the video camera 58c and the video camera 58b. The P2P communication path 64 may include a leg 64c formed between the video camera 58b and the video camera 58a. In some instances, the P2P communication path 64 is established dynamically, as video cameras 58 find themselves in communication range with one or more other video cameras 58. Each of the video cameras 58 may dynamically form the P2P communication path 64 with one, two, three or more distinct video cameras 58, limited only by wireless communication ranges and signal strength.

Figure 6:
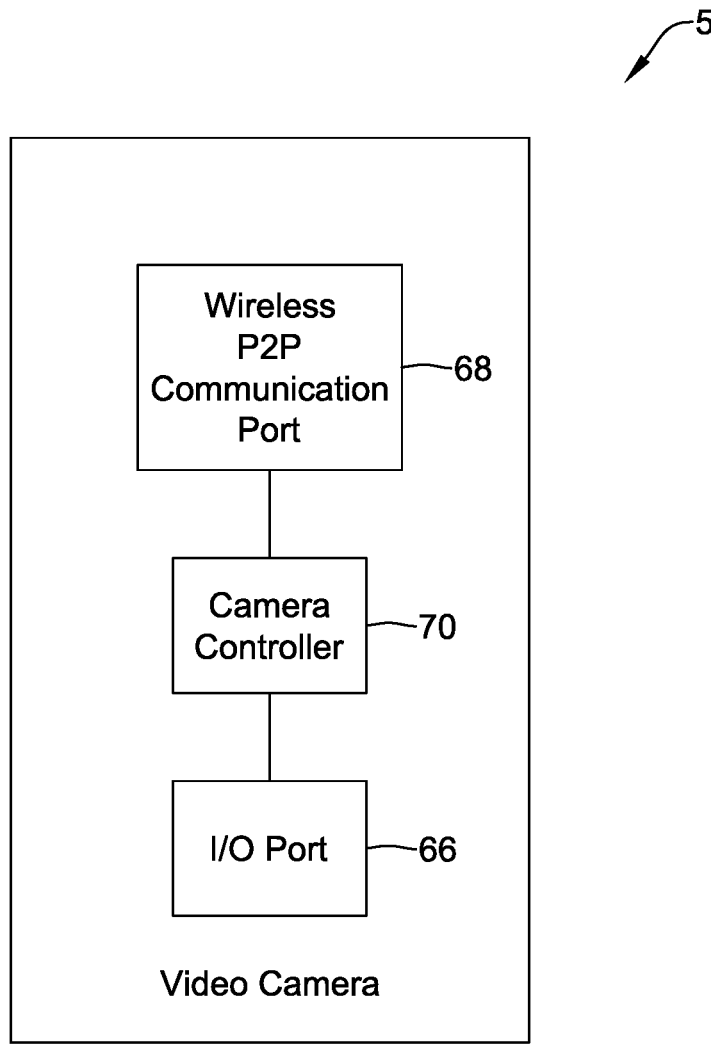
FIG. 6 is a schematic block diagram of a video camera forming part of the illustrative security system of FIG. 5.

FIG. 6 is a schematic block diagram of an illustrative video camera 58. The details shown within the video camera 58 may be included in any or all of the video cameras 58, for example. The video camera 58 includes an I/O port 66 for communicating a video stream captured by the corresponding video camera 58 to the central controller 60 via the one or more networks 62. The video camera 58 includes a wireless peer-to-peer communication port 68 for establishing a wireless peer-to-peer communication with one or more neighboring ones of the plurality of video cameras 58 via the P2P communication path 64, for example. The video camera 58 includes a camera controller 70 that is operatively coupled to the I/O port 66 and the wireless peer-to-peer communication port 68.

In some cases, the camera controller 70 includes a lower function mode, wherein in the lower function mode, the corresponding video camera produces a lower quality video stream that causes the corresponding video camera to consume less power and/or causes the corresponding video camera to consume less bandwidth when communicating the lower quality video stream to the central controller via the one or more networks. The camera controller 70 may also include a higher function mode, wherein in the higher function mode, the corresponding video camera produces a higher quality video stream that causes the corresponding video camera to consume more power and/or causes the corresponding video camera to consume more bandwidth when communicating the higher quality video stream to the central controller via the one or more networks. When so provided, the camera controller 70 is configured to detect an occurrence of a security event adjacent the first one of the plurality of video cameras 58 when the first one of the plurality of video cameras 58 is in the lower function mode, and in response, the camera controller 70 is configured to switch to the higher function mode and send a message to one or more neighboring ones of the plurality of video cameras 58 via the wireless peer-to-peer communication port 68 to switch the one or more neighboring ones of the plurality of video cameras 58 from their lower function mode to their higher function mode.

In some instances, the camera controller 70 may be configured to detect an occurrence of a security event adjacent the first one of the plurality of video cameras 58 by detecting motion in the lower quality video stream. In some instances, the camera controller 70 may be configured to detect an occurrence of a security event adjacent the first one of the plurality of video cameras 58 by detecting motion from a motion sensor (e.g. PIR sensor) operatively coupled to the camera controller 70.

In some instances, the camera controller 70 may place the first one of the plurality of video cameras 58 in the lower function mode in accordance with a programmable schedule. In some instances, the camera controller 70 may remain in the higher function mode for a predetermined time after no security events are detected in the higher function mode. In some instances, the camera controller 70 may be configured to detect an occurrence of a security event in a predetermined region adjacent the first one of the plurality of video cameras 58 when the first one of the plurality of video cameras 58 is in the lower function mode, and in response, the camera controller 70 may be configured to switch to the higher function mode and send a message to one or more neighboring ones of the plurality of video cameras 58 via the wireless peer-to-peer communication port 68 to switch the one or more neighboring ones of the plurality of video cameras 58 from their lower function mode to their higher function mode. In some cases, the predefined region may represent only part of the field of view of the first one of the plurality of video cameras 58 (e.g. region corresponding to a window or a door).

Figure 7:
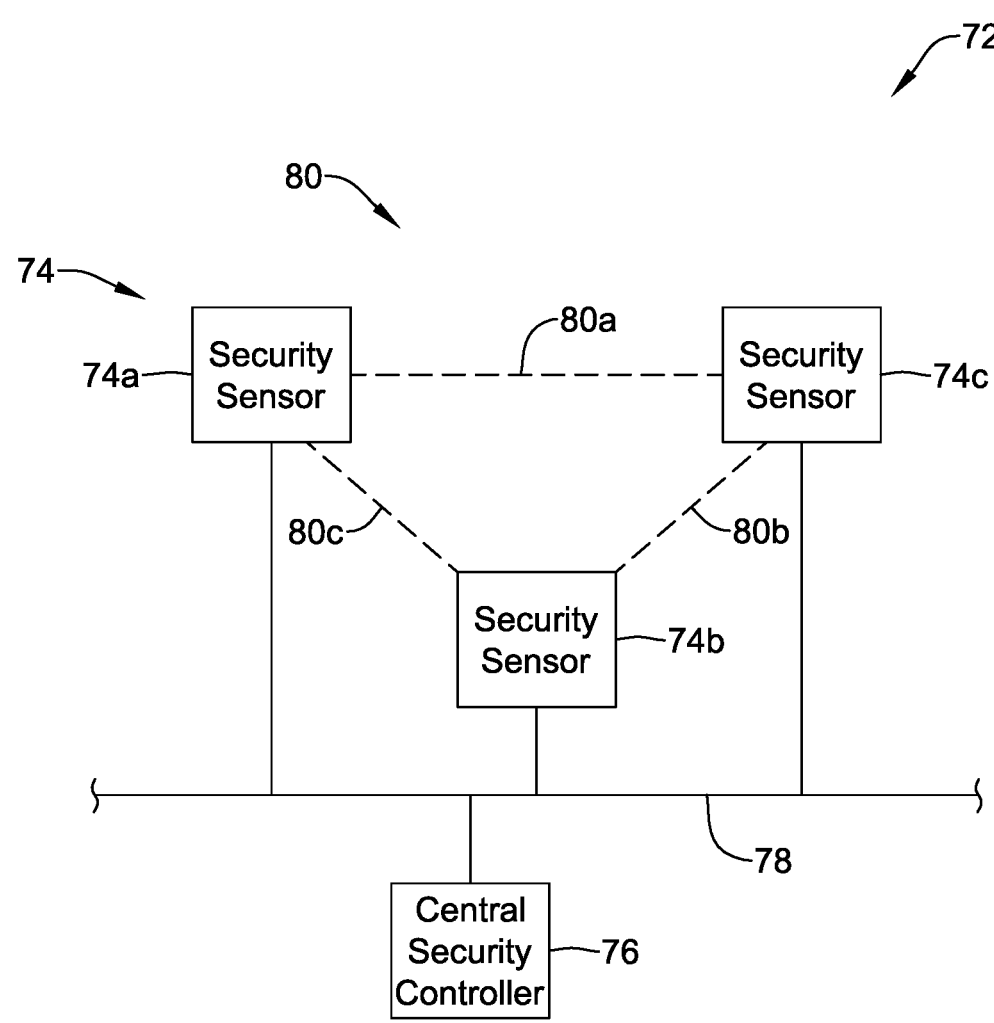
FIG. 7 is a schematic block diagram of an illustrative security system.

FIG. 7 is a schematic block diagram of an illustrative security system 72. The illustrative security system 72 may be considered as being an example of the building control system 10, for example. The security system 72 includes a number of security sensors 74, individually labeled as 74a, 74b and 74c. While a total of three security sensors 74 are shown, it will be appreciated that this is merely illustrative, as the security system 72 may include any number of security sensors 74, and in some instances may include considerably more than three security sensors 74. The security system 72 includers a central security controller 76 that may be in communication with the security sensors 74 via a network 78. The network 78 may be a wired network. In some instances, the network 78 may be a wireless network. The network 78 may be a single network, or may represent two or more networks coupled together, for example.

In some instances, each of the security sensors 74 may include a wireless communication capability. In some instances, the security sensors 74 may establish a wireless peer-to-peer (P2P) communication path 80 between the individual security sensors 74. As an example, the P2P communication path 80 may include a leg 80a formed between the security sensor 74a and the security sensor 74c. The P2P communication path 80 may include a leg 80b formed between the security sensor 74c and the security sensor 74b. The P2P communication path 80 may include a leg 80c formed between the security sensor 74b and the security sensor 74a. In some instances, the P2P communication path 80 is established dynamically, as security sensors 74 find themselves in communication range with one or more other security sensors 74. Each of the security sensors 74 may dynamically form the P2P communication path 80 with one, two, three or more distinct security sensors 74, limited only by wireless communication ranges and signal strength.

The security sensors 74 may be considered as including a first security sensor, such as the security sensor 74a, that is configured for detecting a security event. In response to the first security sensor 74a detecting the security event, the first security sensor 74a may send a message to a first neighboring security sensor (such as the security sensor 74b) via the wireless peer-to-peer communication path 80, the message indicating the detection of the security event by the first security sensor 74a. The first neighboring security sensor 74b either validates the security event by detecting the security event or does not validate the security event by not detecting the security event. The first security sensor 74a and/or the first neighboring security sensor 74b report the security event to the central security controller 76 of the security system 72 via the network 78 that is separate from the wireless peer-to-peer communication path 80, the reported security event is assigned a confidence score that is dependent on whether the first neighboring security sensor 74a was able to validate the security event or not. In some instances, the first security sensor 74a may be of a different sensor type than the first neighboring security sensor 74b. As an example, the first security sensor 74a may include a camera and the first neighboring security sensor 74b may include a motion sensor.

FIG. 8 is a flow diagram showing an illustrative method 82 for monitoring device health of a building control device. The illustrative method 82 includes establishing a peer-to-peer communication path between the building control device and a neighboring building control device, as indicated at block 84. A time window is established to send via the peer-to-peer communication path one or more device health parameters from the building control device to the neighboring building control device, the one or more device health parameters providing an indication of the device health of the building control device, as indicated at block 86. When the neighboring building control device does not receive the one or more device health parameters from the building control device during the time window, the neighboring building control device sends an alert to a building control system, as indicated at block 88. In some instances, the neighboring building control device sends the alert to the building control system via a communication network that is separate from the peer-to-peer communication path.

In some cases, a plurality of building control devices may be configured and arranged such that each of the plurality of building control devices communicate with a neighboring one of the plurality of building control devices via a peer-to-peer communication path in a round-robin fashion. In such an arrangement, each building control devices communicate with the neighboring one of the plurality of building control devices during an assigned time window. When a communication is not received during the respective time window, the building control device that was supposed to transmit during the respective time window has gone non-responsive, and in some cases an alert may be provided to the central security controller. When a communication is received during the respective time window, the status of one or more device health parameters received from the building control device may be analyzed by the neighboring building control device, and an alert may be provided to the central security controller when appropriate.

FIG. 9 is a flow diagram showing an illustrative method 90 for monitoring a health status of each of a plurality of services running on a building control device of a building control system, wherein the health status of each of the plurality of services is selected from two or more predetermined health status conditions including a normal health status and a hung health status, wherein the hung health status indicates that the corresponding service is currently down and/or otherwise non-responsive. The illustrative method 90 includes establishing a peer-to-peer communication path between the building control device and a neighboring building control device of the building control system, as indicated at block 92. The building control device determines the health status of each of the plurality of services running on the building control device, as indicated at block 94. The method 00 includes sending via the peer-to-peer communication path to the neighboring building control device the health status of each of the plurality of services of the building control device, as indicated at block 96. The neighboring building control device reports an alert to a building control system when the health status of one or more of the plurality of services of the building control device are in the hung health status, as indicated at block 98. In some instances, the neighboring building control device may report the alert to the building control system via a communication network that is separate from the peer-to-peer communication path.

FIG. 10 is a flow diagram showing an illustrative method 100 for operating a security camera that includes an I/O port for communicating a video stream captured by the corresponding video camera to the central controller via the one or more networks, a wireless peer-to-peer communication port for establishing a wireless peer-to-peer communication with one or more neighboring security cameras. The illustrative method 100 includes placing the camera controller into a lower function mode, wherein in the lower function mode, the security camera produces a lower quality video stream that causes the security camera to consume less power and/or causes the security camera to consume less bandwidth when communicating the lower quality video stream to the central controller via the one or more networks, as indicated at block 102. An occurrence of a security event adjacent the security camera is detected when the security cameras is in the lower function mode, as indicated at block 104. In response, the security camera is switched to a higher function mode, wherein in the higher function mode, the security camera produces a higher quality video stream that causes the security camera to consume more power and/or causes the security camera to consume more bandwidth when communicating the higher quality video stream to the central controller via the one or more networks, as indicated at block 104a. Also, in response, a message is sent to one or more of neighboring security cameras via the wireless peer-to-peer communication port to switch the one or more neighboring security cameras from their lower function mode to their higher function mode, as indicated at block 104b.

Figure 11B:
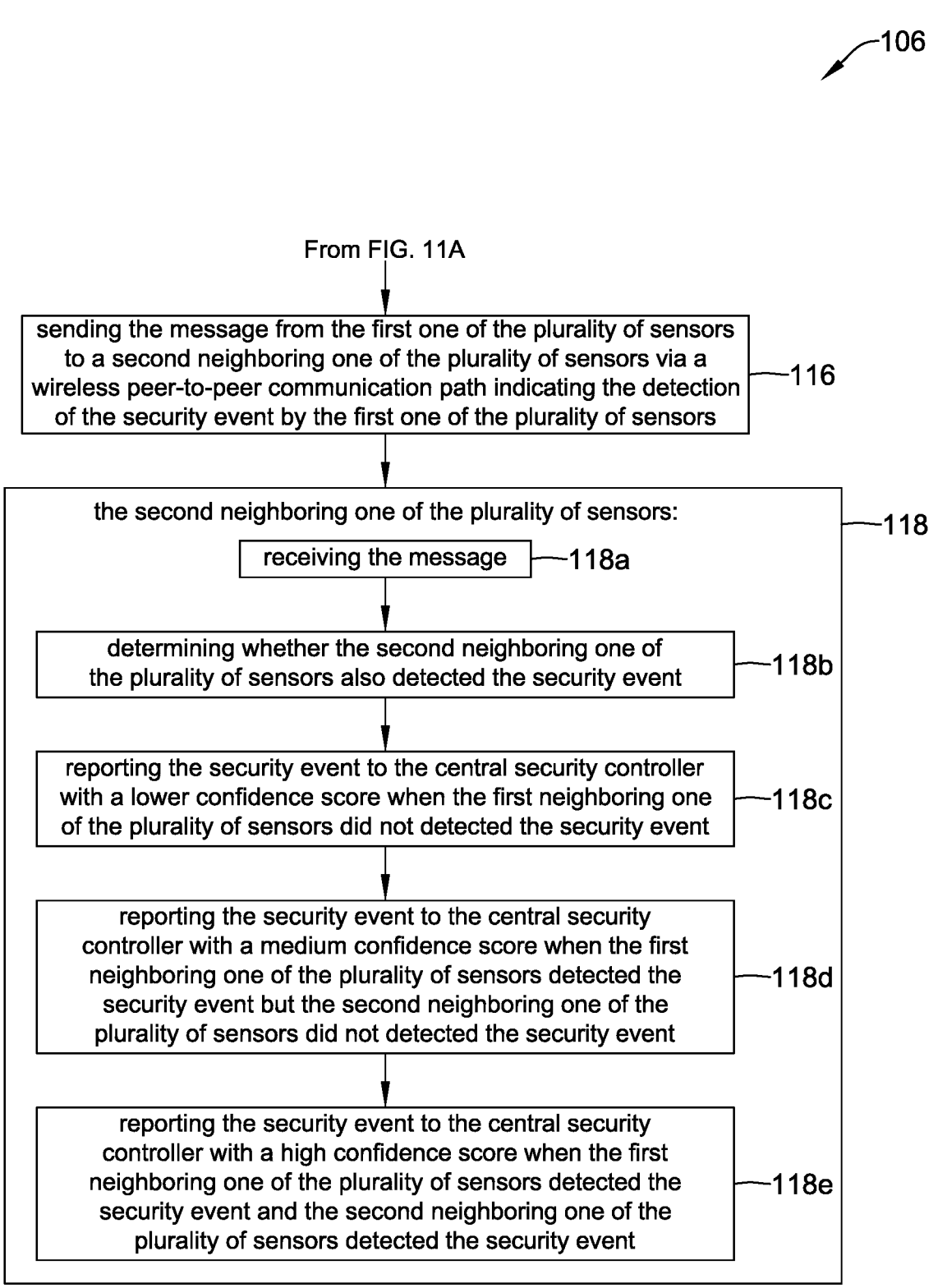

FIGS. 11A and 11B are flow diagrams that together show an illustrative method 106 for operating a security system that includes a plurality of sensors each for detecting a corresponding security event. The method 106 includes detecting a security event via a first one of the plurality of sensors, as indicated at block 108. A message indicating the detection of the security event by the first one of the plurality of sensors is sent from the first one of the plurality of sensors to a first neighboring one of the plurality of sensors via a wireless peer-to-peer communication path indicating the detection of the security event by the first one of the plurality of sensors, as indicated at block 110. The first neighboring one of the plurality of sensors carries out several actions, as indicated at block 112. The several actions include receiving the message, as indicated at block 112a. The several actions include determining whether the first neighboring one of the plurality of sensors also detected the security event, as indicated at block 112b. The several actions include reporting the security event to a central security controller with a lower confidence score when the first neighboring one of the plurality of sensors did not detected the security event, as indicated at lock 112c. The several actions include reporting the security event to the central security controller with a higher confidence score than the lower confidence score when the first neighboring one of the plurality of sensors also detected the security event, as indicated at block 112d. In some instances, the first one of the plurality of sensors may be of a different sensor type than the first neighboring one of the plurality of sensors. As an example, the first one of the plurality of sensors may include a camera and the first neighboring one of the plurality of sensors may include a motion sensor. In some instances, the method 106 may further include automatically pairing the first one of the plurality of sensors and the first neighboring one of the plurality of sensors.

In some instances, and as continued on FIG. 11B, the method 106 may include sending the message from the first one of the plurality of sensors to a second neighboring one of the plurality of sensors via a wireless peer-to-peer communication path indicating the detection of the security event by the first one of the plurality of sensors, as indicated at block 116. The second neighboring one of the plurality of sensors takes several actions, as indicated at block 118. The actions include receiving the message, as indicated at block 118a. The actions include determining whether the second neighboring one of the plurality of sensors also detected the security event, as indicated at block 118b. The actions include reporting the security event to the central security controller with a lower confidence score when the first neighboring one of the plurality of sensors did not detected the security event, as indicated at block 118c. The actions include reporting the security event to the central security controller with a medium confidence score when the first neighboring one of the plurality of sensors detected the security event but the second neighboring one of the plurality of sensors did not detected the security event, as indicated at block 118d. The actions include reporting the security event to the central security controller with a high confidence score when the first neighboring one of the plurality of sensors detected the security event and the second neighboring one of the plurality of sensors detected the security event, as indicated at block 118e.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method for monitoring a health status of each of a plurality of services running on a building control device of a building control system comprising a central controller, wherein the building control device is operatively coupled to the central controller via a first network, wherein the health status of each of the plurality of services is selected from two or more predetermined health status conditions including a normal health status and a hung health status, wherein the hung health status indicates that the corresponding service is currently down and/or otherwise non-responsive, the method comprising:

establishing a peer-to-peer communication path between the building control device and a neighboring building control device of the building control system, wherein the peer-to-peer communication path is separate from the first network;

the building control device determining the health status of each of the plurality of services running on the building control device;

the building control device sending the health status of at least those services running on the building control device that are determined to have the hung health status to the neighboring building control device via the peer-to-peer communication path; and in response to receiving from the building control device the health status of at least those services running on the building control device that are determined to have the hung health status, the neighboring building control device reporting an alert to the central controller via the first network that indicates that at least one service of the building control device has the hung health status.

2. The method of claim 1, wherein the building control system comprises a video monitoring system, and the building control device comprises a video camera.

3. The method of claim 1, wherein:

the first network is a wired network; and the peer-to-peer communication path is a wireless communication path.

4. The method of claim 1, wherein a neighboring building control device of the building control system is also operatively coupled to the central controller via the first network, the method further comprising:

the building control device configured to wirelessly transmit a health message to the neighboring building control device via a peer-to-peer communication path during a predetermined time window; and the neighboring building control device reporting an alert to the central controller via the first network when the building control device fails to wirelessly transmit the health message via the peer-to-peer communication path during the predetermined time window.

5. The method of claim 4, wherein the health message includes the health status of at least those services running on the building control device that are determined to have the hung health status, if any.

6. The method of claim 2, wherein the plurality of services comprises a video analytics service that applies one or more video analytics to a video stream captured by the video camera.

7. The method of claim 2, wherein the plurality of services comprises a camera control service that controls a pan, a tilt, a zoom, a focus, and or an iris of the video camera.

8. The method of claim 2, wherein the plurality of services comprises a streaming service that controls streaming of a video stream captured by the video camera.

9. The method of claim 2, wherein the plurality of services comprises a network service that controls network communication between the building control device and one or more other devices of the building control system.

10. The method of claim 1, wherein at least some of the plurality of services correspond to one or more application programs running on the building control device, wherein the one or more application programs are separate from and are supported by an operating system of the building control device.

11. The method of claim 1, wherein the building control system comprises:

a video monitoring system, and the building control device comprises one of a video camera, an intrusion sensor, and an access control device; and/or a Heating, Ventilation and/or Air Conditioning (HVAC) system, and the building control device comprises an HVAC device.

12. The method of claim 1, further comprising repeatedly determining the health status of each of the plurality of services running on the building control device.

13. The method of claim 1, further comprising taking action to correct the one or more of the plurality of services of the building control device that have a hung status.

14. The method of claim 13, wherein taking action comprises rebooting the building control device.

15. The method of claim 13, wherein taking action comprises restarting the one or more of the plurality of services of the building control device that have a hung status.

* * * * *